United States Patent
Agrawal et al.

(10) Patent No.: US 10,341,018 B2
(45) Date of Patent: Jul. 2, 2019

(54) METHODS AND SYSTEMS FOR ADJUSTING AN ORIENTATION OF A LIGHT SENSOR

(71) Applicant: QUALCOMM Incorporated, San Diego, CA (US)

(72) Inventors: Meghna Agrawal, Sunnyvale, CA (US); Suresh Kumar Bitra, Mangalagiri (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/211,916

(22) Filed: Dec. 6, 2018

(65) Prior Publication Data

US 2019/0109641 A1    Apr. 11, 2019

Related U.S. Application Data

(63) Continuation of application No. 15/265,478, filed on Sep. 14, 2016, now Pat. No. 10,158,425.

(51) Int. Cl.
*H04B 10/116* (2013.01)
*H04B 10/50* (2013.01)
*H04W 4/02* (2018.01)

(52) U.S. Cl.
CPC ......... *H04B 10/116* (2013.01); *H04B 10/502* (2013.01); *H04W 4/02* (2013.01)

(58) Field of Classification Search
CPC ...... H04B 10/116; H04B 10/502; H04W 4/02
USPC ........................................ 398/116
See application file for complete search history.

(56) References Cited

U.S. PATENT DOCUMENTS

| | | | |
|---|---|---|---|
| 2008/0281515 A1 | 11/2008 | Ann et al. | |
| 2011/0033181 A1* | 2/2011 | Jang | H04B 10/1149 398/25 |
| 2013/0004184 A1 | 1/2013 | Jang et al. | |
| 2013/0266327 A1 | 10/2013 | Bae et al. | |
| 2014/0186026 A1* | 7/2014 | Oshima | H04B 10/116 398/25 |
| 2014/0241730 A1 | 8/2014 | Jovicic et al. | |
| 2014/0270796 A1 | 9/2014 | Jovicic et al. | |
| 2014/0280316 A1 | 9/2014 | Ganick et al. | |
| 2014/0301737 A1 | 10/2014 | Guo et al. | |
| 2014/0375982 A1 | 12/2014 | Jovicic et al. | |
| 2015/0036016 A1 | 2/2015 | Jovicic | |
| 2015/0093107 A1 | 4/2015 | Jovicic et al. | |

(Continued)

FOREIGN PATENT DOCUMENTS

| | | |
|---|---|---|
| CN | 105337665 A | 2/2016 |
| EP | 2658150 A1 | 10/2013 |

(Continued)

OTHER PUBLICATIONS

International Search Report and Written Opinion—PCT/US2017/049964—ISA/EPO—dated Dec. 4, 2017.

*Primary Examiner* — Juan A Torres
(74) *Attorney, Agent, or Firm* — Hunter Clark PLLC

(57) ABSTRACT

Methods, systems, and devices are described for commissioning light fixtures. One method may include receiving, at a mobile device, an encoded light signal from a light fixture in a plurality of light fixtures. The encoded light signal may be decoded to obtain an identifier associated with the light fixture, and a correspondence between the identifier and a plurality of locations of the plurality of light fixtures may be determined.

19 Claims, 8 Drawing Sheets

(56) References Cited

U.S. PATENT DOCUMENTS

| | | |
|---|---|---|
| 2015/0163459 A1 | 6/2015 | Jovicic et al. |
| 2015/0223277 A1 | 8/2015 | Jovicic et al. |
| 2015/0276399 A1 | 10/2015 | Breuer et al. |
| 2015/0372753 A1 | 12/2015 | Jovicic et al. |
| 2016/0037293 A1 | 2/2016 | Jovicic et al. |
| 2016/0142140 A1 | 5/2016 | Oshima et al. |
| 2016/0191158 A1 | 6/2016 | Aoyama et al. |
| 2018/0076891 A1 | 3/2018 | Agrawal et al. |

FOREIGN PATENT DOCUMENTS

| | | |
|---|---|---|
| EP | 2940900 A1 | 11/2015 |
| WO | 2015148199 A1 | 10/2015 |

* cited by examiner

METHODS AND SYSTEMS FOR ADJUSTING AN ORIENTATION OF A LIGHT SENSOR

CROSS-REFERENCE TO RELATED APPLICATIONS

This application is a continuation of application Ser. No. 15/265,478, filed Sep. 14, 2016, entitled "METHODS AND SYSTEMS FOR ADJUSTING AN ORIENTATION OF A LIGHT SENSOR," which is hereby incorporated herein by reference for all purposes.

BACKGROUND a. Field

Embodiments described herein are directed to obtaining measurements of signals acquired from a light transmitting device.

a. Information

As the light emission efficiency of the light emitting diode (LED) is improved and the cost thereof decreases, the LED has become common in general lighting applications for residential, commercial, outdoor, and industrial market segments. LEDs have also become common in special lighting applications such as lighting applications in portable devices, display devices, vehicles, sign lamps, signboards, etc. By encoding (e.g., modulating or otherwise affecting operation of) information in signals transmitted from one more LEDs in a light fixture, it is possible to transmit information via the generated light signal in a manner which may not be perceived by a person but which may be detected by an electronic device, e.g., having a photo detector or array of photo detectors (e.g., a CMOS image sensor and/or rolling shutter image sensor of a camera).

Encoded light signals transmitted by such and other like light fixtures may, for example, be used for mobile device functions such as positioning, orienting, navigating, etc. To perform certain functions, it may be useful for a mobile device to make use of some physical correspondence between the locations of a set of identifiable light fixtures (e.g., identified by their encoded light signals).

SUMMARY

Briefly, one particular implementation is directed to a method, at a mobile device, comprising: transitioning operation of the mobile device to a mode to process visual light communications (VLC) received from one or more light sources at a light sensor of the mobile device; generating a prompt to a user through a user interface to adjust an orientation of a light sensor on the mobile device so as to affect collection of light from one or more light sources; and continuing processing of VLC received at the light sensor following adjustment of the orientation of the light sensor by the user.

Another particular implementation is directed to a mobile device comprising: a light sensor; a user interface; and one or more processors configured to: initiate transition of operation of the mobile device to a mode to process visual light communications (VLC) received from one or more light sources at the light sensor; generate a prompt to a user through a user interface to adjust an orientation of the light sensor on the mobile device so as to affect collection of light from one or more light sources; and continue processing of VLC received at the light sensor following adjustment of the orientation of the light sensor by the user.

Another particular implementation is directed to a non-transitory storage medium comprising computer readable instructions stored thereon which are executable by a processor of a mobile device to: initiate transition of operation of the mobile device to a mode to process visual light communications (VLC) received from one or more light sources at a light sensor of the mobile device; initiate generation of a prompt to a user through a user interface to adjust an orientation of a light sensor on the mobile device so as to affect collection of light from one or more light sources; and continue processing of VLC received at the light sensor following adjustment of the orientation of the light sensor by the user.

Another particular implementation is directed to a mobile device, comprising: means for transitioning operation of the mobile device to a mode to process visual light communications (VLC) received from one or more light sources at a light sensor of the mobile device; means for generating a prompt to a user through a user interface to adjust an orientation of a light sensor on the mobile device so as to affect collection of light from one or more light sources; and means for continuing processing of VLC received at the light sensor following adjustment of the orientation of the light sensor by the user.

The aforementioned implementations are merely example implementations, and claimed subject matter is not necessarily limited to any particular aspect of these example implementations.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

Figure 1:
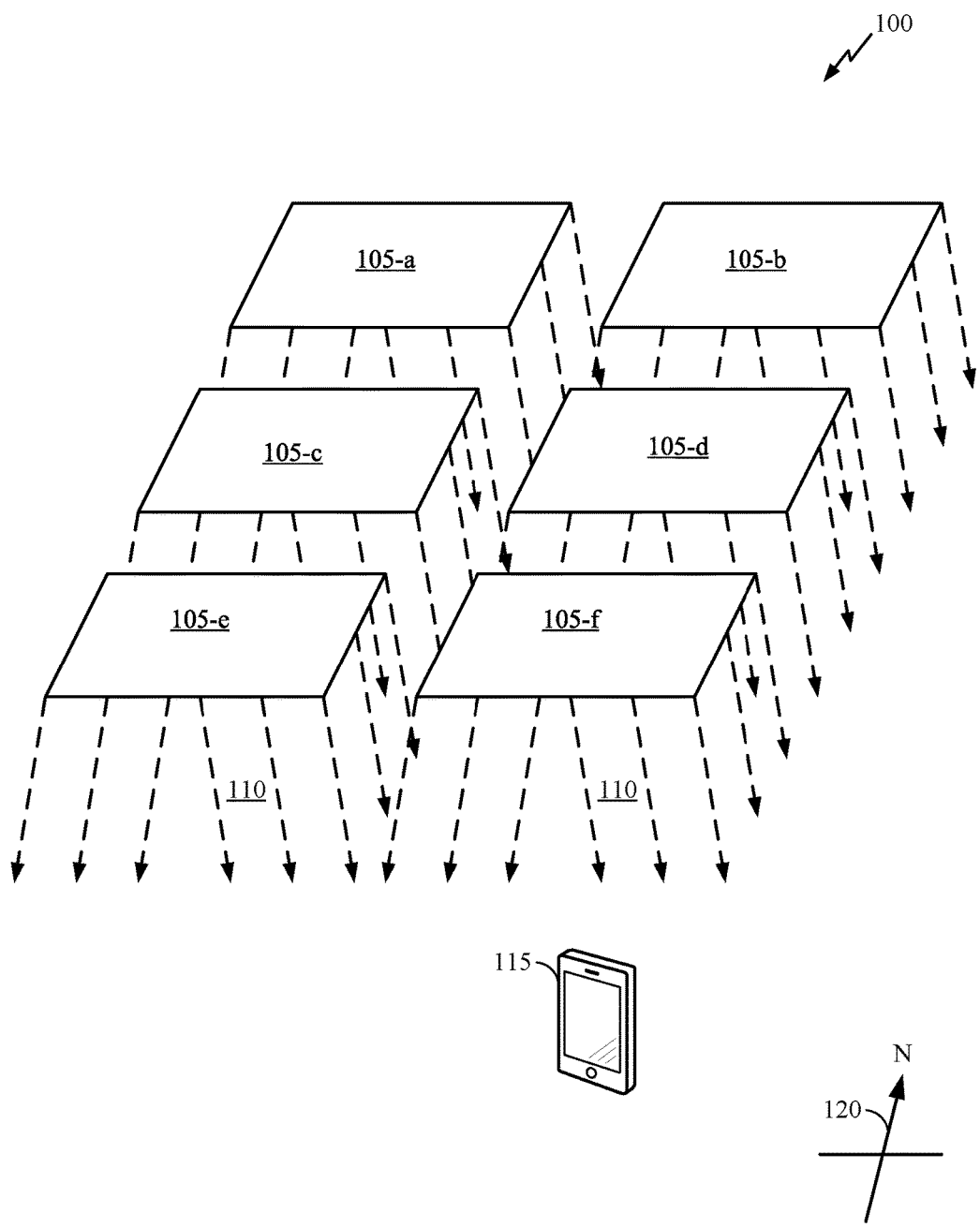
FIG. 1 is a diagram of an example of a mobile device positioned below a number of light fixtures, in accordance with certain example implementations.

Several techniques for use in light fixture commissioning using encoded light signals are described by way of example herein. An encoded light signal may, for example, comprise one or more detectable characteristics (e.g., frequency, intensity, phase, on/off, etc.), patterns (e.g., based on some encoding scheme that nay modulate or otherwise affect one or more characteristics), and/or the like or some combination thereof just to name a few examples, and which may convey some form of information in-whole or in-part from the light fixture to an observing device. In one set of embodiments, light fixture commissioning may be performed (possibly automatically) by a mobile device, for example, using time-stamped identifiers of light fixtures obtained from encoded signals received at the mobile device, and from time-stamped sensor measurements acquired at the mobile device. The time-stamped sensor measurements may in some cases include directions-of-arrival of the received encoded signals. The time-stamped sensor measurements may be used to determine a sequence of time-stamped locations of the mobile device with respect to a location of each of a plurality of light fixtures (e.g., as the mobile device is moved under the plurality of light fixtures). In certain instances, a time-stamp may be applied by a sensor, or by another circuit coupled to the sensor, such as, e.g., a processor, memory, etc. A correspondence between the time-stamped identifiers and the locations of the plurality of light fixtures may be determined, at least in part, by correlating the time-stamped identifiers with the time-stamped locations of the mobile device, which locations of the mobile device may have a reference that is known or determined with respect to the plurality of locations of the plurality of light fixtures. In another set of embodiments, light fixture commissioning, which may also be referred to as mapping, may be performed semiautomatically or manually at a mobile device. In these particular embodiments, for example, a mobile device may obtain identifiers of light fixtures from encoded signals received at the mobile device and provide or otherwise make use of an interface or the like (e.g., at the mobile device, at some other device, or both) via which all or part of one or more of the locations or other information of interest of one or more of the light fixtures corresponding to the identifiers may be input, selected (e.g., from a displayed map of light fixture locations), changed, or otherwise manipulated in some manner, just to name a few examples. In some embodiments, some or all of the locations of each of the plurality of light fixtures may in some cases be estimated or approximated by the mobile device based, at least in part, on directions-of-arrival of the encoded signals received at the mobile device and/or based on other information.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. In other embodiments, Visual Light Communication (VLC) technology may be used as an indoor positioning technology leveraging stationary light sources comprising light emitting diode (LED) bulbs. In an implementation, fixed LED light sources may broadcast positioning signals using rapid modulation of light output level in a way that does not affect their primary functionality of providing illumination. The positioning signals may be received at light sensors (e.g., mounted in smartphone devices as a front-facing camera imager). Light sensors may capture line of sight energy from light sensors (e.g., image sensors) and are used to compute the device's position in the venue. One of the draw backs of VLC based positioning is the sensitivity to an orientation of a light sensor relative to a direction of a line of sight (LOS) of signal from a light source. If a user holds a light sensor (e.g., mounted in a phone) in hand while navigating, the light sensor may not receive LOS signals at a direction approaching a perpendicular to a surface of the light sensor from particular stationary light sources because of an orientation of a light collection surface of the light sensor relative to the direction of the LOS signals.

According to an embodiment, an orientation of a light sensor may be tuned to a "preferred" orientation based, at least in part, on a rough location of the light sensor and locations of fixed light sources. In an implementation, a number of pixels of a light sensor illuminated with energy from an LOS signal from a light source may depend on an angle between a planar surface of the light sensor and an LOS vector to the light source. If the angle is at about 180 degrees, for example, the sensor may not receive any significant LOS signal from the light fixture. If the angle is closer to 90 degrees, however, the light sensor may receive LOS signal from the light fixture at a significant number of pixels of the light sensor.

In a particular implementation of one or more light sensors in a mobile device such as a smartphone, the mobile device may comprise a front-facing light sensor, rear-facing light sensor or a first front-facing light sensor and a second rear-facing light sensor. Here, the aforementioned preferred orientation is not necessarily referenced to a particular front-facing light sensor or rear-facing light sensor. If a smartphone is currently using a rear-facing light sensor for processing a VLC signal, for example, a preferred orientation may be relative to the rear-facing light sensor. This may occur, for example, if a user interface with two different displays which may be activated for a front and rear face. For processing a VLC signal from a particular light source, a particular light sensor may be selected (e.g., among multiple light sensors including a front-facing light sensor and a rear-facing light sensor) having the "best" opportunity to view the particular source. In an implementation, different sensors may be associated with different candidate angles of rotation on a device to best position particular sensors to process a VLC signal from a particular light source (e.g., position the device such that the particular sensor is likely to process the VLC signal with a highest expected signal-to-noise). For example, a particular sensor may be selected as having the best opportunity to view a particular light source if it is likely to be able to process a VLC signal with a highest signal-to-noise, or if the particular sensor is associated with a an angle of rotation that is the smallest candidate angle of rotation (among candidate angles to optimally position associated light sensors). A preferred orientation may then entail an orientation of the device so as to orient the selected light sensor to optimize processing of the VLC signal received at the selected light sensor. As discussed below, a user interface may provide the user with an indication as to how to adjust an orientation of a mobile device so as to optimize processing of a VLC signal received at the selected light sensor.

In particular examples, a light source may also have a particular shape or orientation affecting transmission of LOS signal to a particular light sensor at a particular rough location. In a particular implementation, a preferred orientation of a light sensor may also be determined based, at least in part, on a shape or orientation of a light source transmitting an LOS light signal to the light sensor. By comparing an actual shape of the light fixture and a projected shape visible on camera sensors, a preferred light sensor orientation may be determined. For example, a visual cross-section of a square-shaped light fixture may appear as a non-square shape (e.g., a rhombus) if viewed at an angle off-axis from light fixture.

According to an embodiment, a user interface (e.g., on a smartphone) may provide an indication of a preferred orientation (e.g., indication as to how to move the smartphone to achieve the preferred orientation). In an implementation, a preferred orientation may be used by a VLC positioning application to display on a user interface, such that user can alter the device orientation aligning to it, so that a maximum number of pixels can receive an LOS signal, thus improving VLC positioning operations. In one implementation, the user interface may provide an indication of a preferred orientation continuously while or whenever a device is in a particular mode for processing VLC signals. In an alternative implementation, the use interface may provide such an indication in the presence of a particular condition such as received power (or related signal-to-noise) of a VLC transmitted from a particular light source is below or diminishes below a threshold value.

Referring now to FIG. 1, a diagram 100 illustrates an example of a mobile device 115 positioned below a number of light fixtures 105-a, 105-b, 105-c, 105-d, 105-e, and 105-f having an orientation 120. In some examples, each of the light fixtures 105 may include a driver circuit and one or more light emitting elements. In one implementation, such a driver circuit may comprise circuitry to modulate a light signal transmitted by the light emitting elements as discussed above. The light emitting elements may include one or more light emitting elements that provide ambient illumination 110, and one or more light emitting elements (e.g., one or more light LEDs) that may be used to transmit an encoded light signal in which an identifier of the light fixture is encoded. In some examples, VLC may comprise an example of communication using encoded light signals. In some cases, the one or more light emitting elements that are used to transmit the encoded signal may be the same one or more light emitting element that provides all or part of the ambient illumination 110.

The light fixtures 105-a, 105-b, 105-c, 105-d, 105-e, and 105-f may in some examples may comprise overhead light fixtures in a building, which overhead light fixtures may have fixed locations with respect to a reference (e.g., a global positioning system (GPS) coordinate system and/or building floor plan). In some cases, the light fixtures 105-a, 105-b, 105-c, 105-d, 105-e, and 105-f may also have fixed orientations with respect to a reference (e.g., a meridian passing through magnetic north). While the term "fixture" is used herein to refer to a light emitting device, such a device need not necessarily be "fixed" for all time in one place (at one location). Thus, in certain implementations, such devices may be "permanently" fixed in place (e.g., affixed to an overhead beam, etc.), or may be "temporarily" fixed in place (e.g., sitting on a platform, shelf, hung from a crane, etc.). Indeed, one of skill in the art may adapt the example techniques herein for use with devices that may undergo some form of movement (e.g., provisioned as part of a retractable/movable roof, a modular structure, etc.).

In some examples, the mobile device 115 may comprise a mobile phone or tablet computer, or the like. The mobile device 115 may include a photo detector or array of photo detectors (e.g., an image sensor) for receiving the encoded signals transmitted by the light fixtures 105 as the mobile device 115 is moved near and/or under the light fixtures 105. In some embodiments, the mobile device 115 may be able to communicate over one or more access networks, such as one or more wireless local area network (WLANs) and/or one or more wireless wide area networks (WWANs). The mobile device 115 may communicate over the one or more access networks with, for example, a server, a light fixture controller, a building automation system, and/or the light fixtures 105.

As the mobile device 115 moves (or is moved) under one or more of the light fixtures 105-a, 105-b, 105-c, 105-d, 105-e, and 105-f, the image sensor of the mobile device 115 may receive light emitted by one or more of the light fixtures 105-a, 105-b, 105-c, 105-d, 105-e, and 105-f and capture an image of part or all of one or more of the light fixtures 105-a, 105-b, 105-c, 105-d, 105-e, and 105-f. The captured image may include one or more illuminated light fixture features, such as corners and/or centroids of the light fixtures 105, and/or stickers and/or other indicia illuminated by the light fixtures 105. Alternatively or additionally, mobile device 115 may receive, from one or more of the light fixtures 105-a, 105-b, 105-c, 105-d, 105-e, and 105-f, encoded signals in which identifiers of the light fixtures 105-a, 105-b, 105-c, 105-d, 105-e, and 105-f are encoded. The received identifier(s) may be used by the mobile device 115 for light fixture commissioning. After light fixture commissioning, the received identifier(s) may be used by the mobile device 115 and/or other devices for purposes such as determining a location of the mobile device 115, orienting the mobile device 115, and/or navigating the mobile device with reference to a GPS coordinate system and/or building floor plan (or map).

Figure 2:
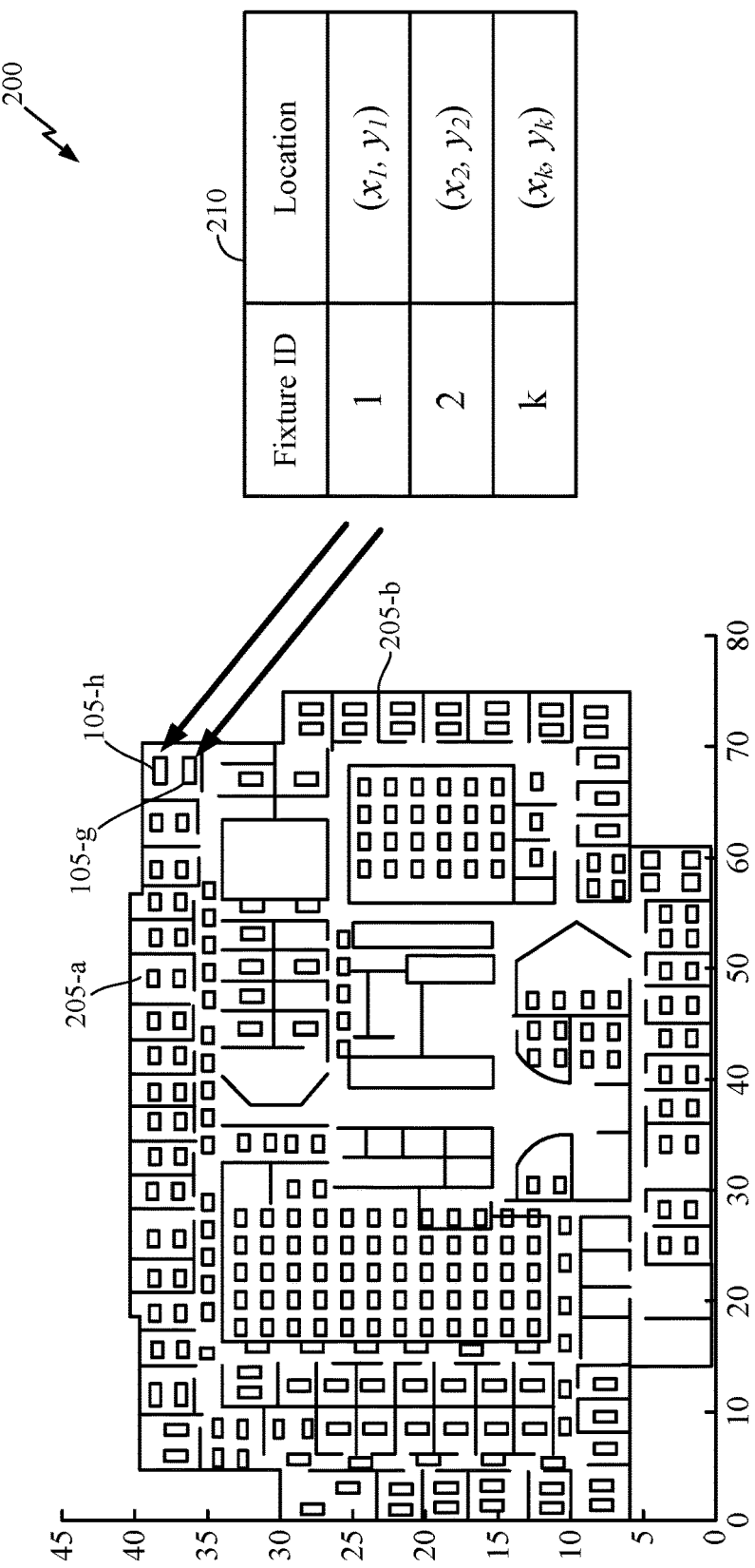
FIG. 2 illustrates an example map of a number of light fixtures, in accordance with certain example implementations.

FIG. 2 illustrates an example map of a number of light fixtures, in accordance with certain example implementations. FIG. 2 illustrates an example map 200 of a number of light fixtures (e.g., light fixtures 105-g, 105-h) arranged within an indoor environment. In some examples, the light fixtures 105-g, 105-h may comprise examples of aspects of the light fixtures 105 described with reference to FIG. 1. By way of example, the map illustrates locations of the light fixtures 105-g, 105-h within a venue (e.g., on a building floor), and illustrates the locations of walls 205-a, 205-b and other features, which may include wall-mounted fixtures (e.g., sconces), with respect to the locations of the light fixtures 105-g, 105-h. In some cases, the locations of the light fixtures 105-g, 105-h may be indicated in coordinate form (e.g., x-y coordinates, such as $(x_1, y_1)$, $(x_2, y_2)$, and/or $(x_k, y_k)$), as depicted in table 210.

During the performance of light fixture commissioning (e.g., mapping) using a mobile device, as described herein, a correspondence between identifiers of the light fixtures 105-g, 105-h and locations of the light fixtures 105-g, 105-h may be determined and saved by the mobile device. The correspondence may in some cases be saved in a database file and transmitted to one or more other devices, such as a remote server, light fixture controller, and/or building automation system, over an access network (e.g., a wireless local area network (WLAN) and/or wireless wide area network (WWAN)) with which the mobile device may communicate.

Figure 3:
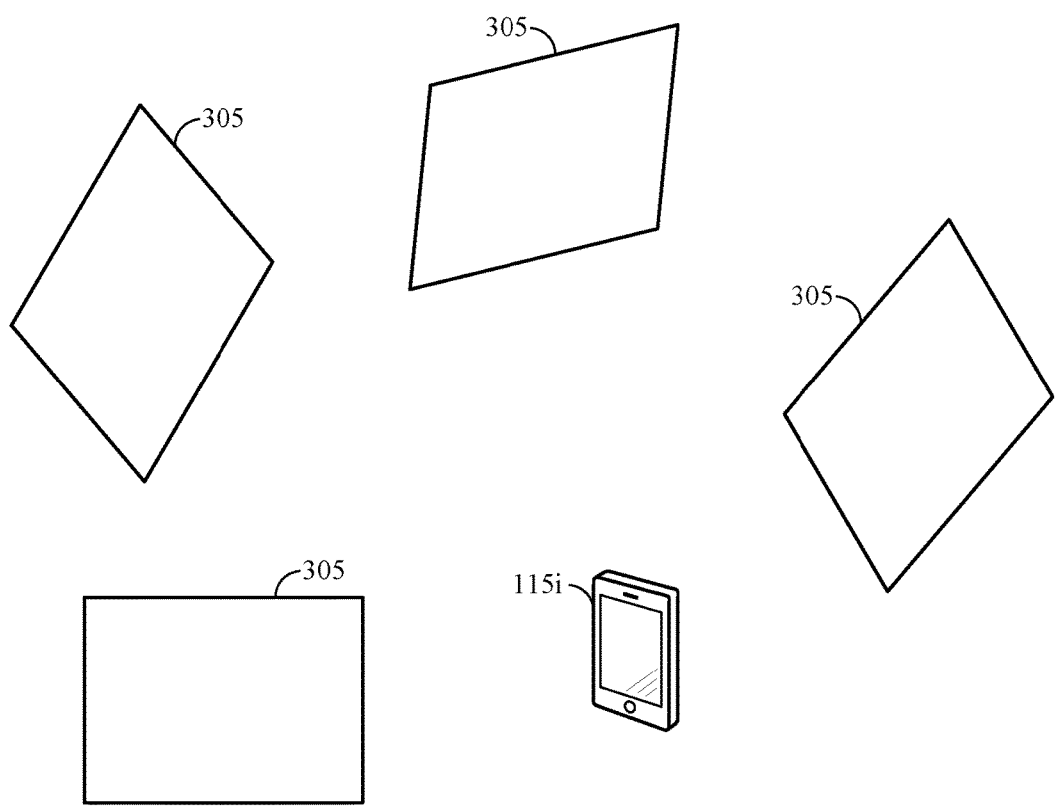
FIG. 3 illustrates an example of a mobile device positioned with respect to a number of light fixtures in accordance with an embodiment.
Figure 4:
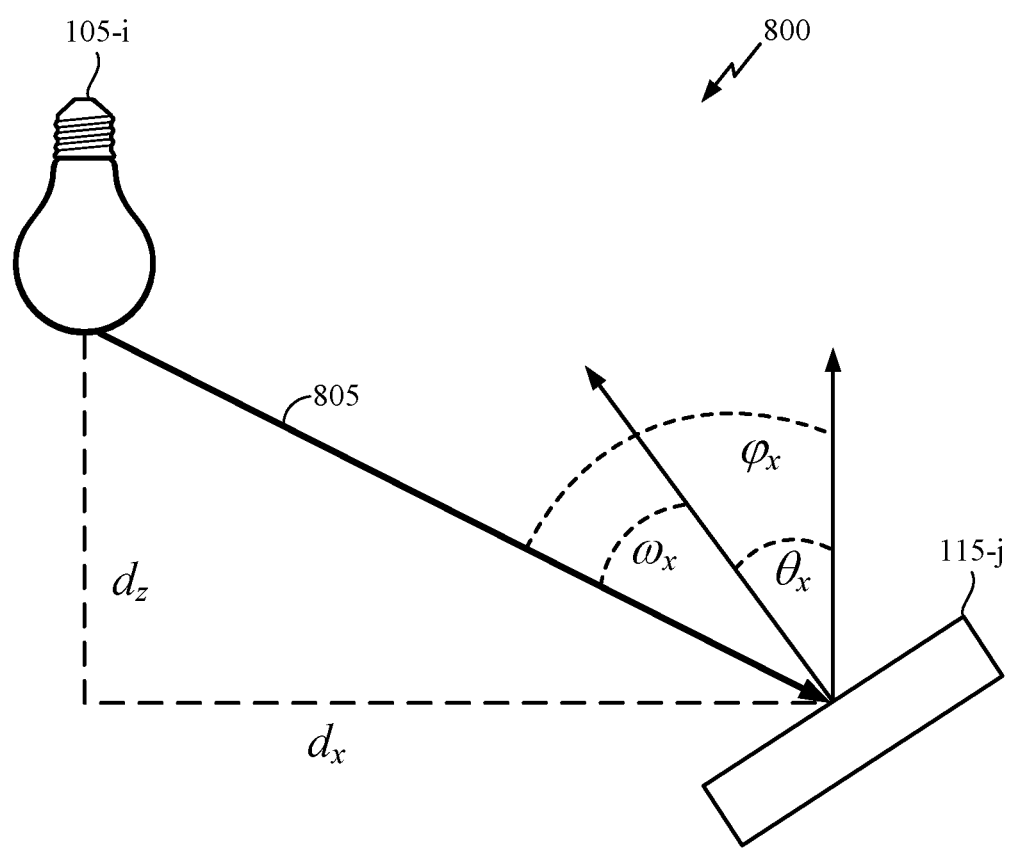
FIG. 4 illustrates an example relationship between the locations of a light fixture and a mobile device, in accordance with certain example implementations.

FIG. 3 illustrates an example relationship between a location of a light fixture and a mobile device in accordance with an embodiment. In the particular embodiment, of FIG. 1, light fixtures are positioned directly over mobile device 115-i in an indoor area. In the example implementation of FIG. 3, light fixtures 305 are not all positioned over mobile device 115-i. Some light fixtures 305 may be positioned as sconces, positioned as freestanding lamp fixtures with a base maintaining an LED at a particular above ground, ground-based or ground-level LED arrays directing light upward toward mobile device 115-$i$, just to provide a few examples. As pointed out above, in particular examples, a light source may have a particular shape or orientation affecting transmission of LOS signal to a particular light sensor at a particular rough location. In a particular implementation, a preferred orientation of a light sensor may also be determined based, at least in part, on a shape or orientation of a light source transmitting an LOS light signal to the light sensor. By comparing an actual shape of the light fixture and a projected shape visible on camera sensors, a preferred light sensor orientation may be determined. For example, a visual cross-section of a square-shaped light fixture may appear as a non-square shape (e.g., a rhombus) if viewed at an angle off-axis from light fixture FIG. 4 illustrates an example relationship 800 between the locations of a light fixture 105-$i$ and a mobile device 115-$j$. In some examples, the light fixture 105-$i$ may comprise an example of aspects of one or more of the light fixtures described with reference to FIGS. 1, 2 and/or 3, and the mobile device 115-$j$ may comprise an example of aspects of one or more of the mobile devices 115 described with reference to FIG. 1, 2, 3, 6A through 6F and/or 7. The light fixture 105-$i$ may be distances $d_x$ and $d_y$ from the mobile device 115-$j$ in an x-y plane parallel to the earth's surface, and may be located at a height $d_z$ from the mobile device 115-$j$ along a line perpendicular to the x-y plane. The direction-of-arrival of an encoded light signal 805 transmitted by light fixture 105-$i$ may be expressed in terms of a pair of angles ($\omega_x$, $\omega_y$) relative to a coordinate system of the mobile device 115-$j$, or in terms of a pair of angles ($\phi_s$, $\phi_y$) relative to the x-y plane parallel to the earth's surface. The pair of angles ($\phi_s$, $\phi_y$) may be derived from the pair of angles ($\omega_x$, $\omega_y$) by compensating for the orientation ($\theta_s$, $\theta_y$) of the mobile device 115 relative to the x-y plane parallel to the earth's surface. In some cases, the encoded light signal may comprise a VLC signal.

If an image sensor is used to receive encoded light signals, each pixel of the image sensor may be mapped to a unique direction-of-arrival ($f_x$, $\omega_y$) relative to the coordinate system of the mobile device 115-$j$. If a location of mobile device 115-$j$ is known, the location of the light fixture 105-$i$ may be determined based at least in part on a location of the mobile device 115-$j$ and a direction-of-arrival of a encoded light signal 805 received from the light fixture 105-$i$. If a location of the light fixture 105-$i$ is known, the location of the mobile device 115-$j$ may be determined based at least in part on the location of the light fixture 105-$i$ and the direction-of-arrival of the encoded light signal 805. In some cases, the location of mobile device 115-$j$ (e.g., if determined based on a location of one or several light fixtures) may be translated into GPS coordinates, a street address, or the like, and may be communicated to a network or network operator via, for instance, in messages from a WLAN or WWAN transmitter (not shown) of mobile device 115-$j$. The determined location of mobile device 115-$j$ may then be used to provide a dispatchable address of its location, which may be used to support emergency response services, for example.

According to an embodiment, a direction of arrival of encoded light signal 805 may affect an ability of mobile device 115-$j$ to receive and process VLC communications in encoded light signal 805. For example, mobile device 115-$j$ may reliably detect and decode encoded light signal 805 if the direction of arrival is perpendicular to a surface of a light sensor receiving encoded light signal 805. However, an ability of mobile device 115-$j$ to decode encoded light signal 805 may degrade as the direction of arrival deviates from being perpendicular to the surface of the light sensor.

According to an embodiment, a mobile device (e.g., mobile device 115 acting as a smartphone or tablet device) may implement and/or activate any one of several applications and/or modes. For example, a mobile device may enable support applications such as voice calls, social media applications or navigation application, just to provide a few examples. To support different applications, such a mobile device may operate in any one of several different "modes" in which different functions or features to enable applications may be configured, enabled, powered off, etc. In an example, a particular mode may be configured or enabled by, for example, powering on particular hardware features (e.g., light sensors, inertial sensors, microphone, display, other user interface hardware, dedicated processing circuitry and/or ASIC etc.) and/or loading related computer/machine instructions to a random access memory for execution by a processor. In one example, a mobile device may transition between modes or to a particular mode by, for example, changing a power state of one or more hardware devices (e.g., turning on or off) and/or loading instructions to a memory for execution by a processor or removing such instructions from memory.

Figure 5:
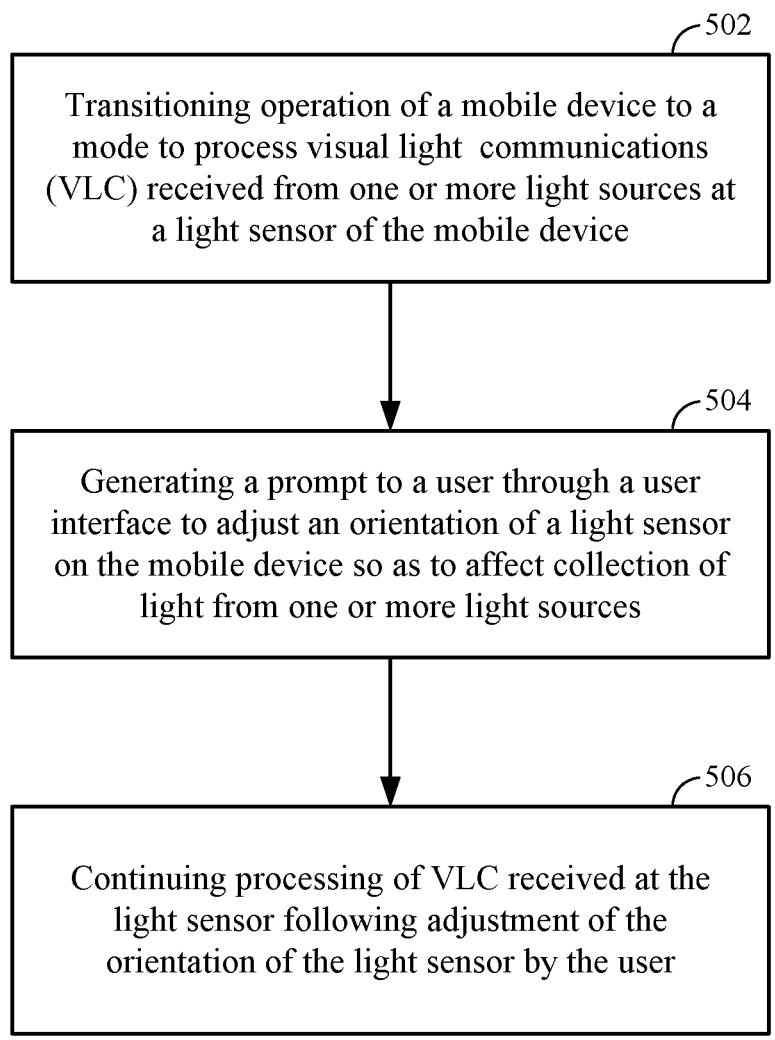
FIG. 5 is a flow diagram of a process directed to prompting a user to adjust an orientation of a light sensor of a mobile device in accordance with an embodiment.
Figure 6A:
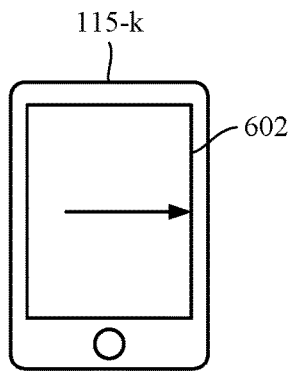
FIGS. 6A through 6H illustrate visual prompts to a user for adjustment of an orientation of a light sensor on a mobile device according to an embodiment.
Figure 6B:
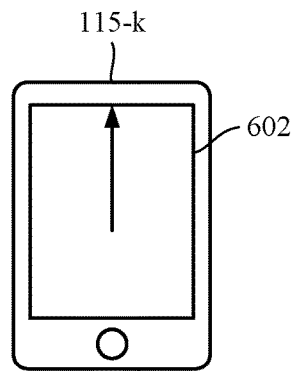
Figure 6C:
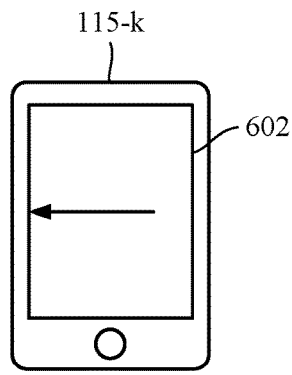
Figure 6D:
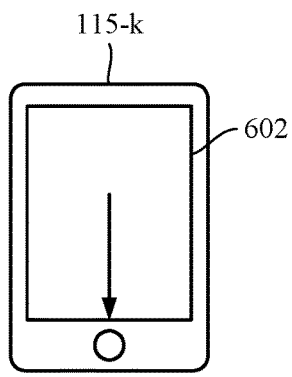
Figure 6E:
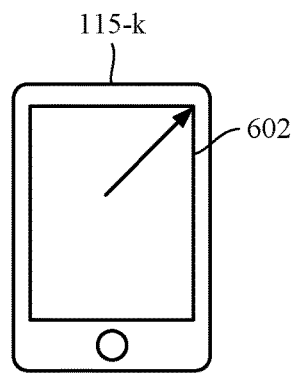
Figure 6F:
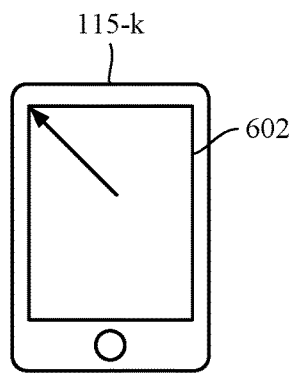
Figure 6G:
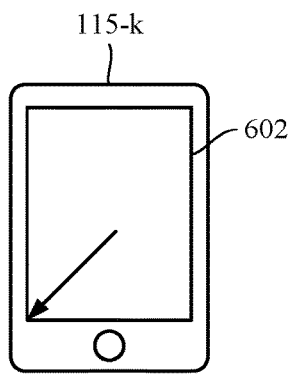
Figure 6H:
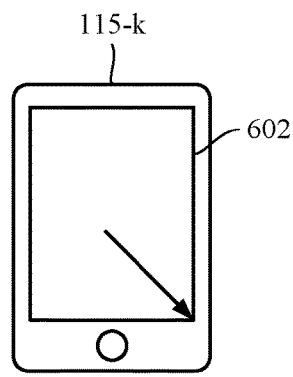

FIG. 5 is a flow diagram of a process directed to prompting a user to adjust an orientation of a light sensor of a mobile device (e.g., mobile device 115) in accordance with an embodiment. At block 502, the mobile device may transition to a particular mode to process VLC communication received from one or more light sources. For example, the mobile device may enable one or more applications supported by the mode to process VLC communications such as, for example, a data communication application or location-based services application (e.g., navigation application), just to provide a couple of examples. In this context, "VLC communication" means communication of information utilizing a visual light source as a signal transmitter, air as a transmission medium and a detection device (e.g., one or more photo diodes, camera imager, etc.). Also in this context, a "transition to a particular mode to process VLC communications" means a change in a state of at least one hardware element on the mobile device and/or change in executable instructions or data on a memory device enabling or enhancing processing of VLC communications received from one or more light sources. In one example, a transition at a mobile device to a particular mode to process VLC communication may comprise, for example, applying power to light sensor such as a camera imager, photodiode or other light sensing device, applying power to processing circuitry and/or ASIC dedicated to processing VLC communication and/or loading, enabling or configuring executable instructions to be executed by a processor from a memory. This, however, is an example of a transition at a mobile device to a particular mode to process VLC communication, and claimed subject matter is not limited in this respect. According to an embodiment, all or portions of actions performed at block 502 may be performed by general purpose application processor 1111 in combination with instructions stored on memory 1140 in response to a particular event such as a request message generated by an application executed and/or enabled by the mobile device. These, however, are examples of particular structures that may be used to implement the actions of block 502, and claimed subject matter is not limited in this respect.

As pointed out above, an ability of a light sensor to reliably receive and process VLC communications from a light source may depend, at least in part, on an orientation of the light sensor relative to the light source. In a particular example, a user of a mobile device (e.g., smartphone or tablet) may affect an orientation of the mobile device (and thus light sensors on the mobile device) by holding the mobile device in one hand and change roll, pitch and/or yaw of the mobile device relative to a reference orientation. At block 504, a mobile device may generate a prompt to a user through a user interface to adjust an orientation of a light sensor on the mobile device so as to affect collection of light from one or more light sources. Here, such an adjustment of the orientation may comprise an adjustment of the orientation such that a direction of a line of sight of a light signal from a light source to be at least approximately perpendicular to a service of the light sensor so as to affect detection and decoding of the light signal, for example. However, this is merely an example of how an orientation of a light sensor may be adjusted so as to affect collection of light on the light sensor, and claimed subject matter is not limited in this respect. Also, such a prompt generated at block 504 may comprise any one of several generated signals perceivable by the user such as, for example, an audible noise, haptic response, image on a display of the mobile device, just to provide a few examples.

According to an embodiment, a mobile device at block 504 may determine a rotational direction to place the mobile device in a preferred orientation, and then generate a prompt to the user to apply the determined rotation (e.g., expressed as roll, pitch and yaw) to place the mobile device in the preferred orientation. According to an embodiment, at block 504 a mobile device may determine a current orientation of the mobile device based, at least in part, on signals from inertial sensors such as, for example, accelerometers (including gravitometers), magnetometers, gyroscopes, just to provide a few examples. The mobile device may then determine a rotation to be applied to the mobile device based, at least in part, on a difference between the preferred orientation and the current orientation.

In one implementation, a mobile device may provide a prompt through a user interface at block 504 automatically in response to a transition at block 502 to a mode to process a VLC signal, and then provide the prompt continuously while in the mode. In an alternative implementation, the user interface may generate the prompt at block 504 while in the mode to process the VLC signal, but in response to an additional condition or event. Such an additional condition or event may comprise, for example, received power (or related signal-to-noise) of a VLC transmitted from a particular light source is below, or diminishes below, a threshold value. In an alternative implementation, if the received power (or related signal-to-noise) subsequently rises above the threshold value, the prompt may terminate.

As pointed out above with reference to FIG. 4, an ability of a light sensor on a mobile device, such as a camera with an imaging sensor, to decode VLC communications in a light signal may be affected by a direction of arrival of the light signal on the light sensor. According to an embodiment, a "preferred orientation" of the mobile device (or a light sensor on the mobile device) may be an orientation such that a direction of arrival of a light signal from a light source is does not deviate substantially from being perpendicular to a surface of the light sensor. For example, such a preferred orientation may comprise a roll, pitch and yaw from a reference orientation such that a direction of arrival of a light signal to a light sensor surface is substantially perpendicular to the light sensor surface. This, however, is an example of a preferred orientation, and claimed subject matter is not limited in this respect. According to an embodiment, such a preferred orientation may be computed based, at least in part, on a location of the light source in three dimensions and a rough location of the mobile device using well known techniques. In one example, a line may be defined as passing through a known location of a light source and a rough location of a mobile device. A preferred orientation may place a surface of a light sensor approximately perpendicular to the line. In a particular implementation, all or portions of actions performed at block 504 may be performed by power circuitry, inertial sensors included in sensors 1160 (e.g., for determining a current orientation of a mobile device) in combination with processing performed by general purpose application processor 1111 and/or DSPs 1112 and/or light fixture controller 1168 in combination with instructions in memory 1140, and further in combination with user interface 1135 (e.g., to convey a prompt to a user to affect an orientation). These, however, are examples of particular structures that may be used to implement the actions of block 504, and claimed subject matter is not limited in this respect.

According to an embodiment, a mobile device at block 506 may continue processing of a received VLC signal following an adjustment of an orientation of the mobile device by a user responsive to a prompt generated at block 504. For example, block 506 may demodulate/decode information encoded in the received VLC signal for use in positioning operations and/or data communication. In a particular implementation, all or portions of actions performed at block 506 may be performed by inertial sensors included in sensors 1160 (e.g., for determining a current orientation of a mobile device) in combination with processing performed by general purpose application processor 1111 and/or DSPs 1112 and/or light fixture controller 1168 in combination with instructions in memory 1140. These, however, are examples of particular structures that may be used to implement the actions of block 506, and claimed subject matter is not limited in this respect.

FIGS. 6A through 6H illustrate visual prompts to a user for adjustment of an orientation of a light sensor on a mobile device according to an embodiment. Such a prompt may be generated in block 504 of the process of FIG. 5, for example. Here, a mobile device 115-$k$ may include a display 602 capable of displaying an image of an arrow indicating a direction of rotation to adjust the mobile device 115-$k$ to or toward a preferred orientation for receiving and processing VLC communications as discussed above. For example, a user holding mobile device 115-$k$ in one hand may rotate mobile device 115-$k$ in the direction of the arrow toward the preferred orientation. In one particular embodiment, the mobile device 115-$k$ may display a different image, make a sound, vibrate or provide some other response indicating that mobile device 115-$k$ has reached or is close to the preferred orientation.

Figure 7:
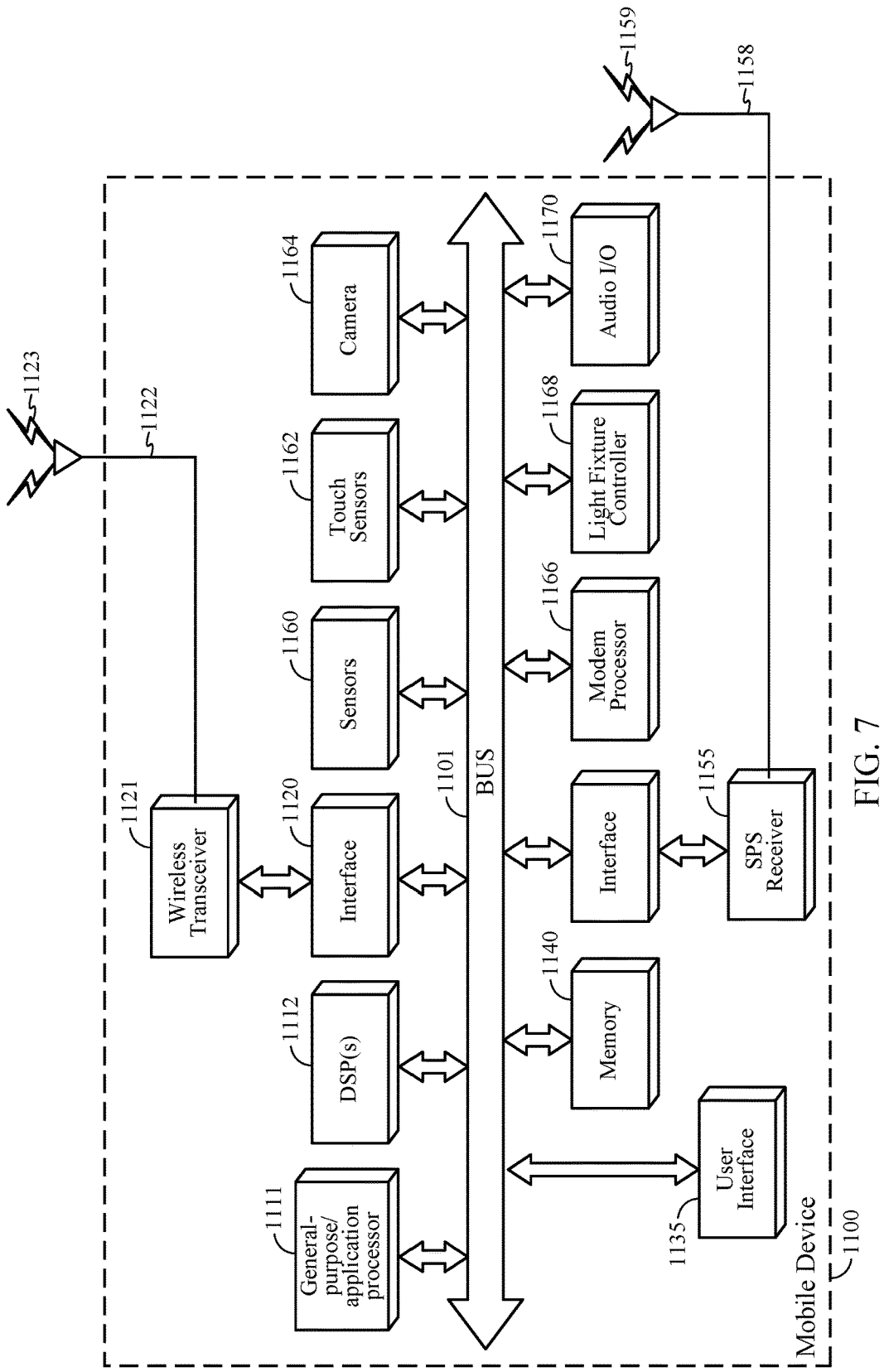
FIG. 7 is a schematic diagram of a mobile device in accordance with an embodiment.

FIG. 7 a schematic diagram of a mobile device according to an embodiment. Mobile device 115 (FIG. 1, 3, 4 or 6A through 6H) may comprise one or more features of mobile device 1100 shown in FIG. 7. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may further comprise a clock comprising circuitry, registers, memory, etc. that is capable of advancing and maintaining a clock state. In a particular implementation, a clock state may be advanced by incrementing a counter or other value on set increment cycles (e.g., in response to an oscillating signal). According to an embodiment, camera device 1164 may detect and/or process a VLC communication (e.g., transmitted from a light source such as light fixtures 105 or 305). As discussed above, camera device may be placed in a preferred orientation so as to best detect a VLC communication to support positioning operations. In particular implementations, the clock may comprise registers, oscillators, input terminals output terminals, etc. capable of providing values indicative of a clock state. In particular embodiments, a clock state maintained at the clock may be used to control processes to execute application functions on in a coordinated fashion on general purpose/application processor 1111, DSP(s) 1112, etc. As pointed out above, a clock state maintained at the clock may be synchronized with clock states maintained by devices other than mobile device 1100.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 7, mobile device 1100 may comprise digital signal processor(s) (DSP(s)) 1112 connected to the bus 1101 by a bus interface, general-purpose processor(s) 1111 connected to the bus 1101 by a bus interface and memory 1140. In a particular implementation, the bus interface may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIG. 5.

Also shown in FIG. 7, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. This, however, is an example of how an audio I/O may be implemented in a mobile device, and claimed subject matter is not limited in this respect. In another implementation, mobile device 1100 may comprise touch sensors 1162 responsive to touching or pressure on a keyboard or touch screen device. In another embodiment, user interface 1135 may covey a prompt to a user to, for example adjust an orientation of a light sensor (e.g., camera device 1164 co-located with user interface 1135) to affect collection of light from one or more light sources. For example, user interface 1135 may comprise a display device to provide prompts as illustrated in FIGS. 6A through 6F as discussed above.

Mobile device 1100 may also comprise a dedicated camera device 1164 for capturing still or moving imagery. Dedicated camera device 1164 may comprise, for example an imaging sensor (e.g., charge coupled device or CMOS imager arranged in pixel elements), lens, analog to digital circuitry, frame buffers, just to name a few examples. In one embodiment, camera device may detect and process VLC signals transmitted form one or more light sources as discussed above. In one implementation, additional processing, conditioning, encoding or compression of signals representing captured images may be performed at general purpose/application processor 1111 or DSP(s) 1112. Also, such additional processing may include demodulation of a portion of a VLC signal to, for example, support positioning operations as discussed above. Alternatively, a dedicated light fixture controller 1168 may perform additional processing of a received VLC signal for conditioning and demodulation.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). These, however, are examples of structures that may perform baseband processing, and claimed subject matter is not limited in this respect.

Figure 8:
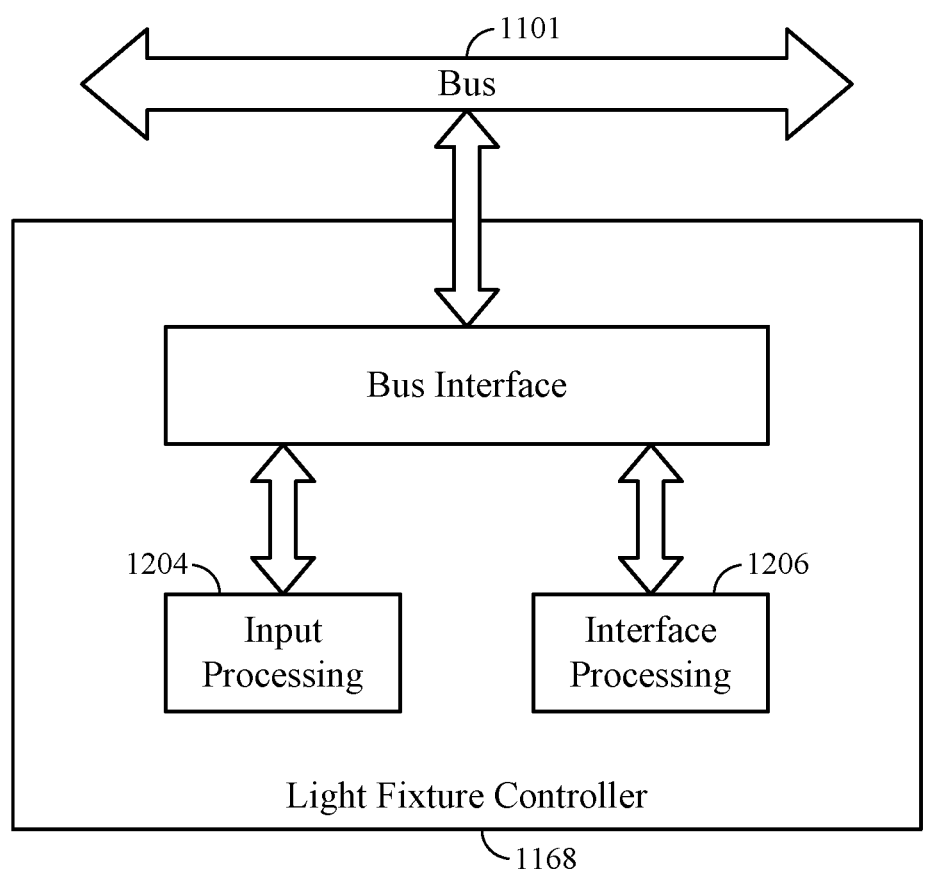
FIG. 8 is a schematic block diagram of an example lighting fixture controller in accordance with an implementation.

FIG. 8 is a schematic diagram of dedicated light fixture controller 1168 according to a particular embodiment. Here, light fixture controller 1168 may communicate with general purpose application processor 1111, camera 1164 and/or memory 1140 through bus 1101. In an implementation, camera 1164 may comprise circuitry to convert a light signal into electrical signals (e.g., photodiodes configured as pixels) light fixture controller 1168 may comprise an input processing circuit 1204 to, for example, at least partially process VLC signals received at camera 1164 to convert the received VLC signals to electrical signals, store in readout circuitry, etc. Input processing circuit 1204 may further processing these electrical signals to support positioning operations as described above. In addition, interface processing circuit 1206 may communicate with user interface 1135 to, for example, generate prompts to a user to adjust an orientation of a light sensor device as discussed above.

Particular implementations discussed herein are directed to processing VLC signals received at light sensors in or on a mobile device such as a smartphone. In another embodiments, light sensors may be integrated with mobile robotic devices to process VLC signals to similarly perform positioning operations. For example, a mobile robotic device may comprise particular light sensors dedicated to acquiring and processing signals for VLC positioning. For example, robots with installed legacy image sensors/cameras may be oriented in a direction of its current activity so that it can perform object detection or legacy functionalities (rather than detection of LOS signals from light sources for VLC positioning). Accordingly, inexpensive light sensors with low resolution may be added and dedicated to VLC positioning on such devices.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. All of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("DAMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled," "connected," and/or similar terms are used generically. These terms are not synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. The following description provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

For ease of description, a network device (also referred to as a networking device) may be embodied and/or described in terms of a computing device. This description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, claimed subject matter is not limited to the particular examples disclosed, but that such claimed subject matter may also include all aspects falling within the scope of the appended claims, and equivalents thereof.

What is claimed is:

1. A method, at a mobile device, comprising:
   determining a current orientation of a light sensor of the mobile device relative to one or more light sources configured to transmit visual light communication (VLC) signals responsive to at least one VLC signal falling below a first threshold, a signal-to-noise (SNR) ratio of the at least one VLC signal exceeding a second threshold, or a combination thereof;
   determining a preferred orientation of the light sensor relative to the one or more light sources for receiving the VLC signals;
   generating a prompt to a user through a user interface to rotate the mobile device to place the light sensor in the preferred orientation from the current orientation; and
   processing of VLC received at the light sensor following placement of the light sensor in the preferred orientation by the user.

2. The method of claim 1, wherein generating the prompt to the user through the user interface to rotate the mobile device to place the light sensor in the preferred orientation further comprises:
   determining a rotational direction to rotate the mobile device to place the light sensor in the preferred orientation from the current orientation.

3. The method of claim 1, wherein the rotational direction comprises a pitch component, a yaw component, a roll component, or any combination thereof.

4. The method of claim 1, wherein determining the preferred orientation of the light sensor relative to the one or more light sources for receiving the VLC signals further comprises:
   determining a direction of a line of sight of a VLC signal from a light source of the one or more light sources; and
   determining the preferred orientation of the light sensor by determining an orientation in which a surface of the light sensor is at least approximately perpendicular to the direction of the line of sight of the VLC signal from the light source.

5. The method of claim 1, wherein determining the current orientation of the light sensor relative to the one or more light sources comprises continually determining the current orientation of the light sensor relative to the one or more light sources; and wherein generating the prompt to the user through the user interface further comprises continually updating the prompt to the user in response to changes in the current orientation of the light sensor relative to the one or more light sources.

6. The method of claim 2, further comprising:
   prompting the user to rotate the mobile device in the determined rotational direction.

7. The method of claim 6, wherein prompting the user to rotate the mobile device in the determined rotational direction further comprises:
   providing haptic feedback to the user of the mobile device indicating that the mobile device should be rotated in the determined rotational direction.

8. The method of claim 6, wherein prompting the user to rotate the mobile device in the determined rotational direction further comprises:
   providing audible signals to the user of the mobile device indicating that the mobile device should be rotated in the determined rotational direction.

9. The method of claim 6, wherein prompting the user to rotate the mobile device in the determined rotational direction further comprises:
   displaying visual prompts to the user of the mobile device indicating that the mobile device should be rotated in the determined rotational direction.

10. A mobile device comprising:
    a memory;
    a light sensor;
    a processor configured to:
    determine a current orientation of the light sensor relative to one or more light sources configured to transmit visual light communication (VLC) signals responsive to at least one VLC signal falling below a first threshold, a signal-to-noise (SNR) ratio of the at least one VLC signal exceeding a second threshold, or a combination thereof;

determine a preferred orientation of the light sensor relative to the one or more light sources for receiving the VLC signals;

generate a prompt to a user through a user interface to rotate the mobile device to place the light sensor in the preferred orientation from the current orientation; and processing of VLC received at the light sensor following placement of the light sensor in the preferred orientation by the user.

11. The mobile device of claim 10, wherein the processor is configured to generate the prompt to the user through the user interface to rotate the mobile device to place the light sensor in the preferred orientation by being configured to:

determine a rotational direction to rotate the mobile device to place the light sensor in the preferred orientation from the current orientation; and prompt the user to rotate the mobile device in the determined rotational direction.

12. The mobile device of claim 10, wherein the processor is configured to determine the preferred orientation of the light sensor relative to the one or more light sources for receiving the VLC signals by being configured to:

determine a direction of a line of sight of a VLC signal from a light source of the one or more light sources; and determine the preferred orientation of the light sensor by determining an orientation in which a surface of the light sensor is at least approximately perpendicular to the direction of the line of sight of the VLC signal from the light source.

13. The mobile device of claim 10, wherein the processor is configured to determine the current orientation of the light sensor relative to the one or more light sources by being configured to continually determine the current orientation of the light sensor relative to the one or more light sources; and wherein the processor is configured to generate the prompt to the user through the user interface by being configured to continually update the prompt to the user in response to changes in the current orientation of the light sensor relative to the one or more light sources.

14. The mobile device of claim 11, wherein the processor is configured to prompt the user to rotate the mobile device in the determined rotational direction by being configured to:

provide haptic feedback, audible signals, visual prompts, or any combination thereof to the user of the mobile device indicating that the mobile device should be rotated in the determined rotational direction.

15. A mobile device comprising:

means for determining a current orientation of a light sensor of the mobile device relative to one or more light sources configured to transmit visual light communication (VLC) signals responsive to at least one VLC signal falling below a first threshold, a signal-to-noise (SNR) ratio of the at least one VLC signal exceeding a second threshold, or a combination thereof;

means for determining a preferred orientation of the light sensor relative to the one or more light sources for receiving the VLC signals;

means for generating a prompt to a user through a user interface to rotate the mobile device to place the light sensor in the preferred orientation; and means for processing of VLC received at the light sensor following placement of the light sensor in the preferred orientation by the user.

16. The mobile device of claim 15, wherein the means for generating the prompt to the user through the user interface to rotate the mobile device to place the light sensor in the preferred orientation further comprises:

means for determining a rotational direction to rotate the mobile device to place the light sensor in the preferred orientation from the current orientation; and means for prompting the user to rotate the mobile device in the determined rotational direction.

17. The mobile device of claim 15, wherein the means for determining the preferred orientation of the light sensor relative to the one or more light sources for receiving the VLC signals further comprises:

means for determining a direction of a line of sight of a VLC signal from a light source of the one or more light sources; and means for determining the preferred orientation of the light sensor by determining an orientation in which a surface of the light sensor is at least approximately perpendicular to the direction of the line of sight of the VLC signal from the light source.

18. The mobile device of claim 15, wherein the means for determining the current orientation of the light sensor relative to the one or more light sources comprises means for continually determining the current orientation of the light sensor relative to the one or more light sources; and wherein the means for generating the prompt to the user through the user interface comprises means for continually updating the prompt to the user in response to changes in the current orientation of the light sensor relative to the one or more light sources.

19. The mobile device of claim 16, wherein the means for prompting the user to rotate the mobile device in the determined rotational direction further comprises:

means for providing haptic feedback, audible signals, visual prompts, or any combination thereof to the user of the mobile device indicating that the mobile device should be rotated in the determined rotational direction.

* * * * *